Nov. 15, 1960     B. E. LONG, JR     2,960,270
THERMOSTATIC VALVES
Filed Oct. 23, 1956
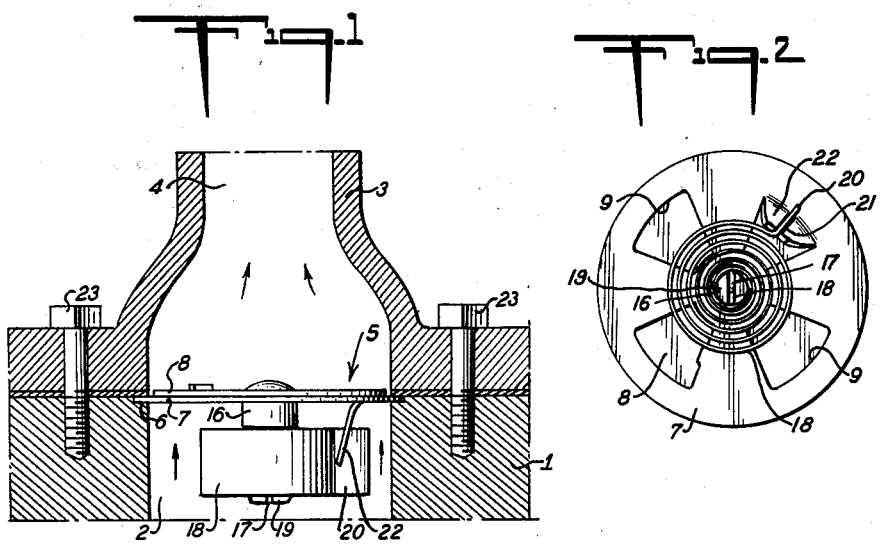
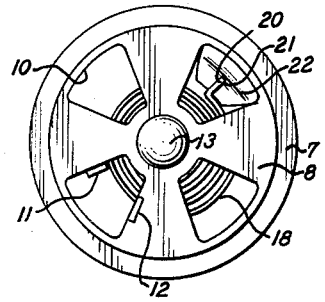
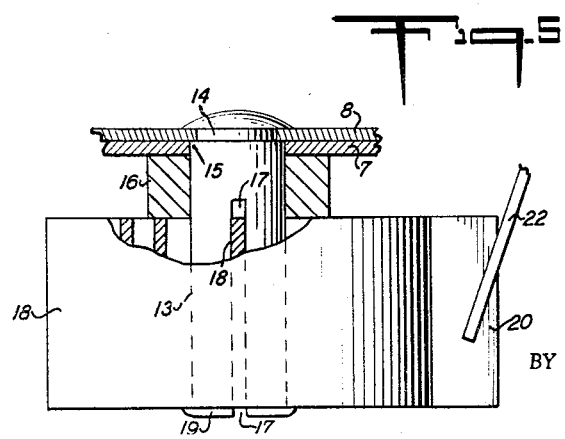
INVENTOR
BALLARD E. LONG, JR.
BY *Schneider & Mathis*
ATTORNEYS

United States Patent Office 2,960,270
Patented Nov. 15, 1960

2,960,270

THERMOSTATIC VALVES

Ballard E. Long, Jr., Powell, Tenn. (2931 Selma Ave., Knoxville, Tenn.), assignor of forty-nine percent to Charles C. Mason, Maynardville, Tenn.

Filed Oct. 23, 1956, Ser. No. 617,783

3 Claims. (Cl. 236—34)

This invention relates to improvements in thermostatic valves of the character used in internal combustion engine water circulating systems to control the flow therethrough. It may have other applications and uses, wherever desired.

It has been the practice heretofore to use thermostatic valves in water circulating systems of internal combustion engines of the bellows or pill type. However, such thermostatic controls for the valves result in a build up of hydraulic pressure which affects materially the action of the thermostatic element, as well as the operation of the valve. Moreover, such controls are expensive and often complex for the use for which they are to be employed.

One object of this invention is to overcome the foregoing objections in valves of this type and to provide for the operation of the valve by the temperature of the water in which it is immersed without its being affected materially by hydraulic pressure therein.

Another object of the invention is to simplify and improve the construction of the thermostatic valve, both as to the valve structure itself and the thermostatic element, so these parts may be manufactured and used in a simple form which will be inexpensive to build.

Still another object of the invention is to provide a thermostatic valve adapted to be mounted in a water circulating system, with the thermostatic element on one side of a mounting plate or other means, and with the control valve member on the opposite side of the mounting means, so as not to be affected materially by hydraulic pressure in the system, the thermostat being on the upstream side of the flow.

These objects may be accomplished, according to one embodiment of the invention, by providing a mounting plate or other means which will support the thermostatic valve in a device in which the flow system is provided and having one or more openings therethrough for flow of the water in the system. A control plate is provided on one side of the support means, the downstream side of the direction of flow of the liquid. This control plate forms the valve member of the device and is connected with a pin that extends through the mounting plate, being journaled therein. The pin is connected also with one end of a bi-metallic coiled spring forming a thermostatic member. This coiled spring is anchored at one end to the valve plate and at the opposite end to suitable support means, such, for example, as the mounting plate, the latter end being held, whereby expansion or contraction of the spring will cause rotary movement of the pin connected therewith and with the valve plate, so as to open or close the latter with respect to the passageway through the flow system.

The location of the thermostatic spring toward the upstream side of the direction of flow allows this spring to respond readily to variations in temperature in the water. At the same time it is not affected materially by a build up of hydraulic pressure, nor does the pressure act against the movable valve plate to any appreciable extent, so as to bind the plate against rotary movement because said plate is located on the opposite side of the mounting plate from the head of liquid flowing therethrough.

This embodiment of the invention is illustrated in the accompanying drawings, in which:

Fig. 1 is a sectional view showing a portion of a hydraulic system of an internal combustion engine to which the invention is applied;

Fig. 2 is a bottom view of the thermostatic valve removed, with the valve member closed;

Fig. 3 is a similar view from the top;

Fig. 4 is a similar view, showing the valve member in open position; and

Fig. 5 is a partial vertical section, parts being in elevation, through the valve structure.

Referring to Fig. 1, a portion of an internal combustion engine cylinder block is designated generally by the numeral 1, within which a water jacket passageway 2 is provided for the circulation of water therefrom in the direction indicated by the arrows in Fig. 1. An outlet conduit is shown at 3, with a water passage 4 therein. This conduit may be a part of the internal combustion engine, or a hose, or other device attached thereto. The water passages 2 and 4 are arranged in alignment, so as to form a water circulating passage for the cooling fluid of the engine, the flow normally being in the direction indicated by the arrows.

Mounted in the water passage is a thermostatic valve device for controlling the flow through the passages 2 and 4 in response to variations in temperature. The thermostatic device is generally indicated at 5 in Fig. 1 and is located preferably on a seat 6, usually provided in the engine block or head.

In this embodiment of the invention, mounting means is provided for the thermostatic valve, preferably in the form of a flat plate, shown at 7, mounted on seat 6 transversely of the passage 2—4 and covering the latter. A valve plate 8 is mounted in face-to-face relation with the supporting plate 7, but on the downstream side of the flow passage 2—4, the plates 7 and 8 are provided with openings 9 and 10, respectively, therein spaced apart and of such size that these openings in the opposed plates will register with each other in one position of the plate 8 with respect to the plate 7 and yet, when turned at 45° in this embodiment, the openings therethrough will be closed, so as to stop the flow through the passages 2—4.

The relative turning movement between the plates is limited in opposite directions by an outturned prong or arm 11 provided on one edge of one of the openings 9 in position to engage in a notch 12 formed in the adjacent edge of the corresponding opening 10 when the plate 8 is closed with respect to the plate 7, or to abut against the opposite edge of the same opening 10 to limit the opening movement in the opposite direction, when the plate is turned through 45° from closed position with respect to the plate 7.

Secured rigidly to the movable valve plate 8 is a pin, shown at 13, and extending transversely through the plates 7 and 8. The pin 13 has a reduced external shoulder portion 14 within the plate 8 after passing through a central opening in the mounting plate 7 in which the pin is journaled. The extreme end of the pin 13 is then flattened or provided with a rivet head, thereby clamping the plate 8 between said headed portion and a shoulder 15 on the end of the pin 13 adjacent the reduce portion 14. This forms a tight secure connection between the plate 8 and the pin 13 which will positively anchor said valve plate to the pin, so as to rotate the plate upon turning movement of the pin.

The pin 13 also extends through a hub member 16 that abuts against the underside of the plate 7, in which hub member 16 the pin 13 is journaled. This hub member 16 tends to stabilize the pin and the turning movement of the valve plate 8 with respect to its mounting means and affords a secure structure which will respond readily to variations in temperature.

The lower end of the pin 13 is slotted at 17. A bi-metallic coiled spring 18 is sleeved over the pin 13, being coiled therearound, and is held in place on the pin in any suitable manner, as, for example, by providing a flattened end portion 19 on the lower end of the pin. One end of the coiled spring 18 is inserted in the slot 17 and the opposite end of said coiled spring is turned laterally, as indicated at 20, and engaged in a slot 21 provided in a downturned flange 22 on the support plate 7, so as to anchor said outer end of the coil to the engine block, while the inner end is free to turn with respect thereto in response to variations in temperature of the water.

Normally, the coil is such as to maintain the flow through the passages 2 and 4 closed, out of communication with each other by the action of the valve plate 8. However, when the water temperature increases, the heat thereof acts on the spring 18 to rotate the pin 13 in a direction normally tending to open the passages through the plates by alignment of the openings 9 and 10 therein, thereby allowing flow through the passages 2 and 4. The degree of opening movement is limited by the stop prong 11 engaging the one side or the other of the adjacent opening 10.

An effective freely rotating valve plate is provided for variation in temperature. The bi-metallic spring 18 is located on the upstream side of the direction of flow, so as to be affected by variations in temperature of the water. The axis of the coiled spring is in the direction of the flow of water. The movable valve plate 8 is located on the opposite side of the mounting means from the coiled spring 18, so as not to be affected materially by the pressure of the water flow through the passages 2 and 4.

Therefore, the pressure of the water will not have an effect which will tend to bind the movable valve plate against the mounting plate 8, as if these were reversed. In this way, a valve control is provided which will not be affected by hydraulic pressures to any material extent, but will respond readily to variations in temperature. Any pressure which may act on the plate 8 through the openings 9 in the plate 7 will tend to separate the plates and thereby assure freedom of turning movement of the valve plate with respect to the mounting plate.

The construction is simple and inexpensive to build and use, and yet provides an effective and secure control of the water flow through the hydraulic system.

When not needed, the thermostatic control valve may be removed, as, for example, by removing the part 3 from the engine block 1. Detachable fastenings are usually provided to hold the conduit 3 in place, one example of which is illustrated at 23 in Fig. 1.

While the invention has been illustrated and described in one embodiment, it is recognized that variations and changes may be made therein, without departing from the invention as set forth in the claims.

I claim:

1. A thermostatic valve comprising a support member having an opening therethrough, a valve member in opposed relation to the support member on one side thereof and having means for controlling the flow through the opening, means mounting the valve member for rotary movement with respect to the support member comprising a pin fixed at one end to the valve member and extending through the support member to the opposite side thereof, means journaling the pin directly in the support member for turning movement relative thereto, a thermostatic coiled member anchored at one end to the pin, a hub surrounding the pin and interposed between the confronting face of the support member and the thermostatic member and bearing against a substantial portion of the thermostatic member, means fixing the opposite end of the thermostatic member against turning movement.

2. A thermostatic valve comprising a support member having an opening therethrough, a valve member in opposed relation to the support member on one side thereof and having means for controlling the flow through the opening, means mounting the valve member for rotary movement with respect to the support member comprising a pin having a surrounding surface journaled in the support member and with a reduced end portion extending in the valve member, said pin having a shoulder between the journaled surface and reduced pin portion, said shoulder engaging said valve member, a head rigid on the pin and cooperating with said journaled portion in clamping the valve member rigidly therebetween, a thermostatic coiled member anchored at one end to the pin, means fixing the opposite end of the thermostatic member against turning movement, and a hub interposed between the face confronting of the support member and the thermostatic member around the pin and engaging a substantial portion of the thermostatic member.

3. A thermostatic valve comprising a support plate having an opening therethrough, a valve plate on one side of the support plate and having an opening therethrough in position to register with the opening in the support plate, means for limiting the opening and closing movements of the valve plate with respect to the support plate including an upstanding prong on the support plate at one radial edge of the opening and engageable with the radial edges in the corresponding opening in the valve plate, a pin having a reduced end portion inserted in the valve plate and a shoulder adjacent said reduced end portion engaging one side of the valve plate, means on the opposite side of the valve plate from the shoulder and cooperating therewith for securing the valve plate rigidly to the pin, the enlarged portion of the pin adjacent the reduced portion journaling the pin in the support plate for turning movement with respect to the support plate, a coiled thermostatic member sleeved over the opposite end of the pin and having one end anchored thereto, a hub interposed between the confronting face of the support plate and the thermostatic member around the pin and engaging a substantial portion of the thermostatic member, and means anchoring the opposite end of the thermostatic member to the support plate for rotation of the pin and valve plate by the thermostatic member upon variations in temperature applied to the thermostatic member.

References Cited in the file of this patent

UNITED STATES PATENTS

| | | |
|---|---|---|
| 1,408,120 | Mirk | Feb. 28, 1922 |
| 1,747,413 | Aseltine | Feb. 18, 1930 |
| 1,795,422 | Bolin | Mar. 10, 1931 |
| 1,806,530 | Giesler | May 19, 1931 |
| 1,926,808 | Hastings | Sept. 12, 1933 |
| 1,978,488 | Donovan et al. | Oct. 30, 1934 |
| 2,177,937 | Goldschmidt | Oct. 31, 1939 |